United States Patent
Yajima et al.

(10) Patent No.: US 9,493,362 B2
(45) Date of Patent: Nov. 15, 2016

(54) DDR-TYPE ZEOLITE POWDER, AND PROCESS FOR THE PRODUCTION OF DDR-TYPE ZEOLITE POWDER

(75) Inventors: Kenji Yajima, Nagoya (JP); Hisayoshi Nonaka, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 160 days.

(21) Appl. No.: 13/196,301

(22) Filed: Aug. 2, 2011

(65) Prior Publication Data

US 2011/0287261 A1 Nov. 24, 2011

Related U.S. Application Data

(63) Continuation of application No. PCT/JP2010/050113, filed on Jan. 7, 2010.

(30) Foreign Application Priority Data

Feb. 5, 2009 (JP) .................................. 2009-024600

(51) Int. Cl.
| | | |
|---|---|---|
| *C01B 39/48* | (2006.01) | |
| *B01J 29/70* | (2006.01) | |
| *C01B 37/02* | (2006.01) | |
| *C01B 39/04* | (2006.01) | |

(52) U.S. Cl.
CPC ................ *C01B 37/02* (2013.01); *B01J 29/70* (2013.01); *C01B 39/04* (2013.01); *C01B 39/48* (2013.01); *Y10T 428/2982* (2015.01)

(58) Field of Classification Search
CPC ......... C01B 39/04; C01B 39/48; B01J 29/70
USPC .................................................. 423/700–718
See application file for complete search history.

(56) References Cited

U.S. PATENT DOCUMENTS 4,698,217 A * 10/1987 Valyocsik ...................... 423/706
5,785,947 A * 7/1998 Zones et al. ................... 423/705
2006/0239906 A1 * 10/2006 Mueller et al. ................ 423/702
2009/0005600 A1    1/2009 Bosch et al.
2009/0011926 A1 *  1/2009 Yajima et al. ................... 502/62

FOREIGN PATENT DOCUMENTS

| JP | 2004-083375 A1 | | 3/2004 |
| WO | 2007/068629 A1 | | 6/2007 |
| WO | 2007/105407 A1 | | 9/2007 |
| WO | WO/2007/105407 | * | 9/2007 |

OTHER PUBLICATIONS

H. Gies, "Studies on Clathrasils: VII. A New Clathrate Compound of Silica: Synthesis, Crystallographic, and Thermal Properties," Journal of Inclusion Phenomena, vol. 2, 1984, pp., 275-278.
A. Stewart, et al., "Synthesis and Characterisation of Crystalline Aluminosilicate Sigma-1," Studies in Surface Science and Catalysis, vol. 37, 1988, pp. 57-64.
M.J. den Exter, et al., "Separation of Permanent Gases on the All-Silica 8-Ring Clathrasis DD3R," Studies in Surface Science and Catalysis, vol. 84, 1994, pp. 1159-1166.
Jorge Gascon, et al., "Accelerated Synthesis of All-Silica DD3R and its Performance in the Separation of Propylene/Propane Mixtures," Microporous and Mesoporous Materials, vol. 115, Issue 3, Nov. 1, 2008, pp. 585-593.
Extended European Search Report, European Application No. 10738388.7, dated Jun. 10, 2015 (8 pages).

* cited by examiner

*Primary Examiner* — David M Brunsman
(74) *Attorney, Agent, or Firm* — Burr & Brown, PLLC (57) ABSTRACT

There is provided a DDR-type zeolite powder composed of fine particles and exhibits a particle size distribution where the majority of the particles have particle diameters converging in the vicinity of the mean particle diameter, and a process for the production of the same. Specifically provided is a process for the production of a DDR-type zeolite powder, which comprises a step of heat-treating a raw material solution at 100 to 180° C., and thereby growing crystals until the mean particle diameter reaches to a level of 0.1 µm or more and below 2.5 µm.

7 Claims, 5 Drawing Sheets

DDR-TYPE ZEOLITE POWDER, AND PROCESS FOR THE PRODUCTION OF DDR-TYPE ZEOLITE POWDER

This application is a continuation of PCT/JP2010/050113, filed Jan. 7, 2010.

FIELD OF THE INVENTION

The present invention relates to a DDR-type zeolite powder used for a catalyst, a catalyst carrier, an adsorbent, a gas separation membrane, a pervaporation membrane, and the like and to a process for the production of the DDR-type zeolite powder.

BACKGROUND OF THE INVENTION

Zeolite is used as a catalyst, a catalyst carrier, an adsorbent, and the like. Zeolite has a molecular sieve function, and a zeolite membrane obtained by forming zeolite into a membrane shape is used as a gas separation membrane or a pervaporation membrane.

Zeolite is classified into LTA, MFI, MOR, AFI, FER, FAU, or DDR depending on the crystal structure. Of these, DDR (Deca-Dodecasil 3R) type zeolite is a crystal having silica as the main component and has pores in the crystal structure. The pore is formed by a polyhedron containing an oxygen eight-membered ring and has a pore size of 4.4×3.6 angstrom.

The DDR-type zeolite has a relatively small pore size among zeolite. Therefore, it can be used as an adsorbent or separation sieve for separating only low molecular gas such as helium ($H_2$), carbon dioxide ($CO_2$), methane ($CH_4$), and ethane ($C_2H_6$), ethylene ($C_2H_4$), propane ($C_3H_8$), and propylene ($C_3H_6$).

Each of the non patent documents 1 to 3 discloses a process for the production of DDR-type zeolite. In these production processes, 1-adamantanamine is used as a structure directing agent (hereinbelow referred to as "SDA"), and tetramethoxysilane, ethylenediamine, and water are used as raw materials to produce a DDR-type zeolite powder of all silica containing no aluminum by hydrothermal synthesis.

Patent Document 1 discloses a technique where the processes for the production of DDR-type zeolite described in the non patent documents 1 to 3 are simplified. In this technique, after a DDR-type zeolite powder as seed crystals is added to and dispersed in the raw material solution containing 1-adamantanamine which is dissolved in ethylenediamine (or after immersing a support where a DDR-type zeolite powder as seed crystals adheres), hydrothermal synthesis is performed.

PRIOR ART DOCUMENTS

Patent Document

Patent Document 1: Patent Document 2004-83375 Non Patent Document:

Non Patent Document 1: H. Gies, Journal of Inclusion Phenomena 2, (1984)275-278

Non Patent Document 2: A. Stewart, D. W. Johnson and M. D. Shannon, Studies in Surface Science and Catalysis vol. 37, (1988) 57-64

Non Patent Document 3: M. J. den Exter, J. C. Jansen, H. van Bekkum, Studies in Surface Science and Catalysis vol. 84, Ed. by J. Weitkamp et al., Elsevier (1994) 1159-1166

However, in the processes for the production of DDR-type zeolite of the non patent documents 1 to 3, a fine DDR-type zeolite powder having a mean particle diameter of below 2.5 μm cannot be obtained without undergoing pulverization or classification of particles.

Further, even in the case of performing pulverization and classification of particles, the resultant DDR-type zeolite powder hardly shows a particle size distribution where the majority of the particles have particle diameters converging in the vicinity of the mean particle diameter. In addition, since the external force is added on the particles due to pulverization, a large number of particles having a high amorphous content rate are generated.

Therefore, in a conventional production process, in the case of trying to obtain a fine DDR-type zeolite powder having a mean particle diameter of below 2.5 μm, the powder has a high amorphous content rate and a low DDR-type zeolite crystal content rate.

When the DDR-type zeolite powder has a high amorphous content rate, various useful properties due to the crystal structure of DDR-type zeolite are hardly exhibited. For example, the capacity of pores effective for adsorption or the like becomes small, and performance as an adsorbent for separating low molecular gas is deteriorated.

In addition, the Patent Document 1 does not disclose any of the particle size distribution of the resultant powder, the content rate of the DDR-type zeolite crystals, and conditions for optimizing the particle size distribution and the content rate of the crystals.

In view of the above problems, the present invention aims to provide a DDR-type zeolite powder composed of fine particles and exhibiting a particle size distribution where the majority of the particles have particle diameters converging in the vicinity of the mean particle diameter, and a process for the production of the powder.

SUMMARY OF THE INVENTION

In order to solve the aforementioned problems, as a result of earnest study, the present inventors found suitable conditions for the crystal growth of DDR-type zeolite seed crystals having a predetermined mean particle diameter, and the finding led to the completion of the present invention. That is, according to the present invention, there are provided a zeolite powder and a process for the production of the zeolite powder shown below.

According to a first aspect of the present invention, a DDR-type zeolite powder is provided having a mean particle diameter of 0.1 μm or more and below 2.5 μm and a particle size distribution where particle sizes of 80% or more of the entire particles are within the range from −45% to +90% with respect to the mean particle diameter.

According to a second aspect of the present invention, a DDR-type zeolite powder according to the first aspect is provided, wherein the mean particle diameter is 0.2 μm or more and below 1.0 μm.

According to a third aspect of the present invention, a DDR-type zeolite powder according to the first or second aspects is provided, wherein a Y value calculated from the formula (III), which shows a ratio of the value of A which is a value after the diffraction intensity of the diffraction peak attributed to the DDR-type zeolite crystal calculated from the formula (I) is corrected to the value of B which is a value after the diffraction intensity attributed to the amorphous contained in the DDR-type zeolite powder calculated from the formula (II) is corrected on the basis of diffraction intensity obtained by X-ray diffraction analysis, is 100 or more:

$$A=Ca-\{(C2-C1)/(\theta2-\theta1)\times(\theta a-\theta1)+C1\} \quad (I),$$

$$B=Cb-\{(C2-C1)/(\theta2-\theta1)\times(\theta b-\theta1)+C1\} \quad (II),$$

$$Y=AB \quad (III);$$

(wherein, C1 is the minimum value of diffraction intensity between a diffraction peak derived from a (012) face of a DDR-type zeolite crystal and a diffraction peak derived from a (104) face of the same crystal, θ1 is a diffraction angle (2θ) showing C1, C2 is the minimum value of diffraction intensity between a diffraction peak derived from a (606) face of a DDR-type zeolite crystal and a diffraction peak derived from a (1 2 20) face of the same DDR-type zeolite crystal, θ2 is a diffraction angle (2θ) showing C2, Ca is diffraction intensity of a diffraction peak derived from a (024) face of a DDR-type zeolite crystal, θa is a diffraction angle (2θ) showing Ca, Cb is the minimum value of diffraction intensity between a diffraction peak derived from a (122) face of a DDR-type zeolite crystal and a diffraction peak derived from a (027) face of the same DDR-type zeolite crystal, and θb is a diffraction angle (2θ) showing Cb).

According to a fourth aspect of the present invention, a process for the production of a DDR-type zeolite powder is provided, the process comprising: a step of subjecting a raw material solution where ethylenediamine containing 1-adamantanamine dissolved therein, silica ($SiO_2$), and water are mixed therein to have a 1-adamantanamine/$SiO_2$ molar ratio of 0.002 to 0.5 and a water/$SiO_2$ molar ratio of 10 to 500 and where DDR-type zeolite seed crystals having a mean particle diameter of 10 to 300 nm are dispersed at 0.001 to 1.0 mass % to a heating treatment at 100 to 180° C. to allow the DDR-type zeolite seed crystals as nuclei to grow until they have a mean particle diameter of 0.1 μm or more and below 2.5 μm.

According to a fifth aspect of the present invention, a process for the production of a DDR-type zeolite powder according to the fourth aspect is provided, wherein the percentage ratio of mass of the DDR-type zeolite powder to the total of mass of the silica contained in the raw material solution and mass of the DDR-type zeolite seed crystal is 50% or more.

A DDR-type zeolite powder of the present invention is composed of fine particles and exhibits a particle size distribution where the majority of the particles have particle diameters converging in the vicinity of the mean particle diameter. In addition, in the process for the production of the DDR-type zeolite powder of the present invention can be obtained a DDR-type zeolite powder composed of fine particles and exhibiting a particle size distribution where the majority of the particles have particle diameters converging in the vicinity of the mean particle diameter.

DETAILED DESCRIPTION OF THE INVENTION

Hereinbelow, an embodiment of the present invention will be described. The present invention is by no means limited to the following embodiment, and changes, modifications, and improvements may be made as long as they do not deviate from the range of the present invention.

1. DDR-Type Zeolite Powder:

1-1. Summary of DDR-Type Zeolite Powder of the Present Invention:

A DDR-type zeolite powder of the present invention has a mean particle diameter of 0.1 μm or more and below 2.5 μm and a particle size distribution where particle sizes of 80% or more of the entire particles are within the range from −45% to +90% with respect to the mean particle diameter.

The "DDR-type zeolite powder" is a powder containing particles having a crystal structure called DDR-type zeolite.

The zeolite crystal has a structure where the basic unit is a tetrahedral structure of $(SiO_4)^{4-}$ and/or $(AlO_4)^{5-}$ and where the basic units are joined together to have a pore.

Particles having a DDR-type zeolite crystal structure include a particle having lattice defect of a DDR-type zeolite crystal in a single particle or containing an impurity therein as well as a particle of a perfect crystal.

A powder containing particles having a DDR-type zeolite crystal structure is an aggregate of solid particles. The solid particles include particles inevitably contained upon preparing a DDR-type zeolite powder as well as a particle having a DDR-type zeolite crystal structure defined above.

The "mean particle diameter" is a median size (d50) in a particle size distribution of solid particles constituting the DDR-type zeolite powder. For example, the mean particle diameter is specified as a median size (d50) in particle size distribution measurement by the laser Doppler method.

A DDR-type zeolite powder of the present invention preferably has a mean particle diameter of 0.2 μm or more and below 1.0 μm from the viewpoint of improvement in adsorption efficiency when the powder is used as an adsorbent.

That "the particle diameter is within the range from −45% to +90% with respect to the mean particle diameter" means that the value of the particle diameter of the particles constituting the powder is within the range from 55% or more and 190% or less of the mean particle diameter value of the powder.

The "particle size distribution" here may be a distribution obtained by a means a person of ordinary skill generally uses and can be obtained on the basis of, for example, particle size distribution measurement by the laser Doppler method.

1-2. Powder Having High DDR-Type Zeolite Crystal Content Rate:

In a DDR-type zeolite powder of the present invention, it is preferable that a Y value calculated from the following formula (III), which shows a ratio of the value of A which is a value after the diffraction intensity of the diffraction peak attributed to the DDR-type zeolite crystal calculated from the following formula (I) is corrected to the value of B which is a value after the diffraction intensity attributed to the amorphous contained in the DDR-type zeolite powder calculated from the following formula (II) is corrected on the basis of diffraction intensity obtained by X-ray diffraction analysis, is 100 or more:

$$A = Ca - \{(C2-C1)/(\theta 2-\theta 1) \times (\theta a - \downarrow 1) + C1\} \quad (I),$$

$$B = Cb - \{(C2-C1)/(\theta 2-\theta 1) \times (\theta b - \theta 1) + C1\} \quad (II),$$

$$Y = A/B \quad (III)$$

Figure 1:
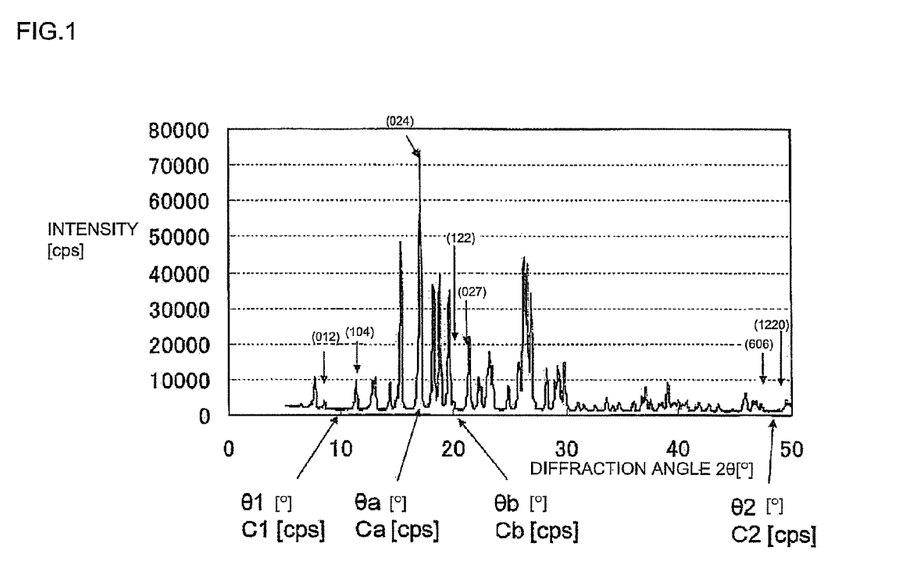
FIG. 1 is a chart showing an example of an X-ray diffraction pattern of a DDR-type zeolite powder.
Figure 2:
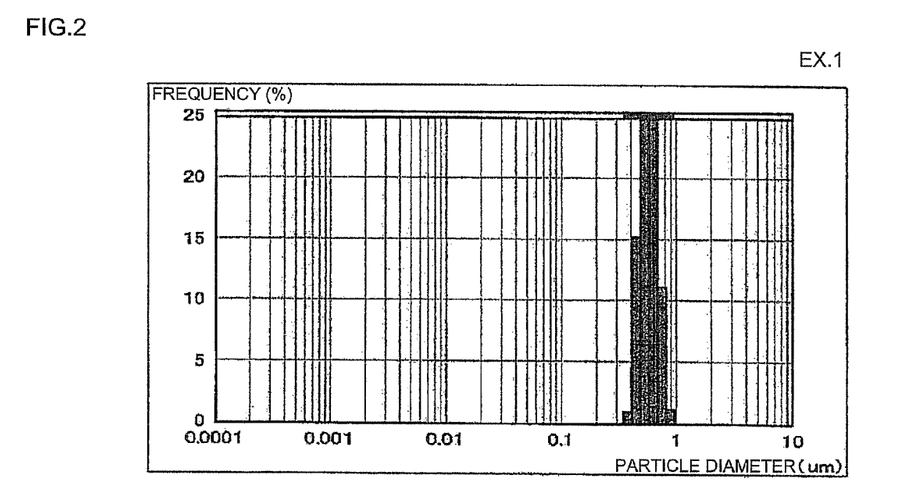
FIG. 2 is a chart showing a particle size distribution of the DDR-type zeolite powder of Example 1.
Figure 3:
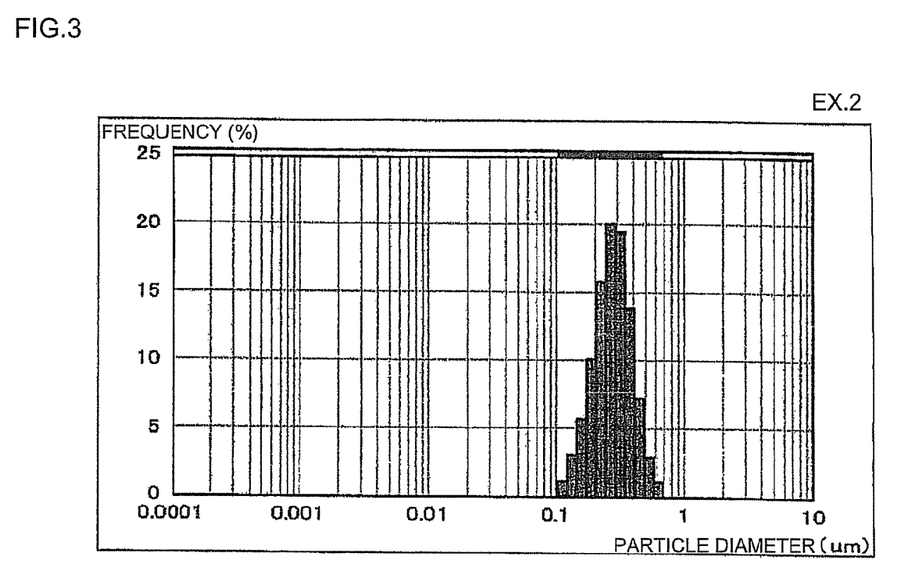
FIG. 3 is a chart showing a particle size distribution of the DDR-type zeolite powder of Example 2.
Figure 4:
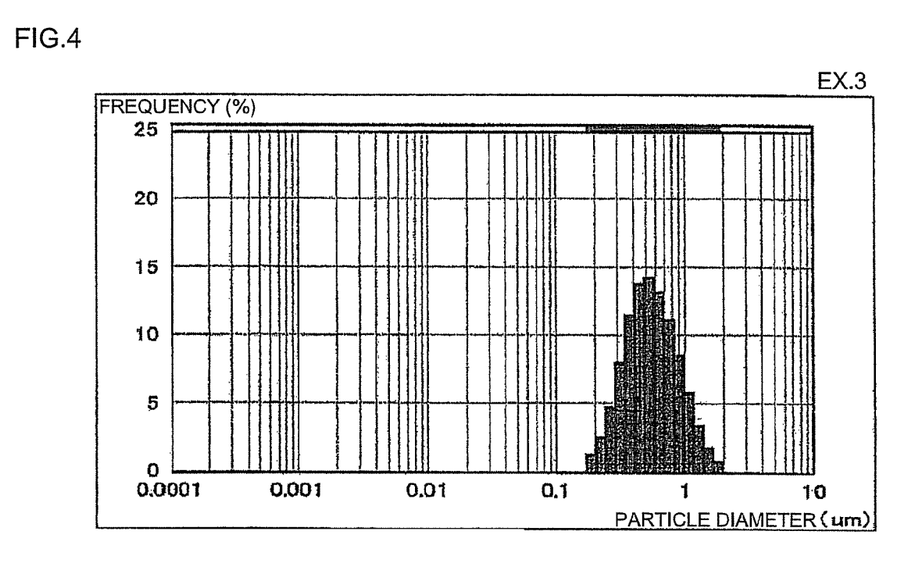
FIG. 4 is a chart showing a particle size distribution of the DDR-type zeolite powder of Example 3.
Figure 5:
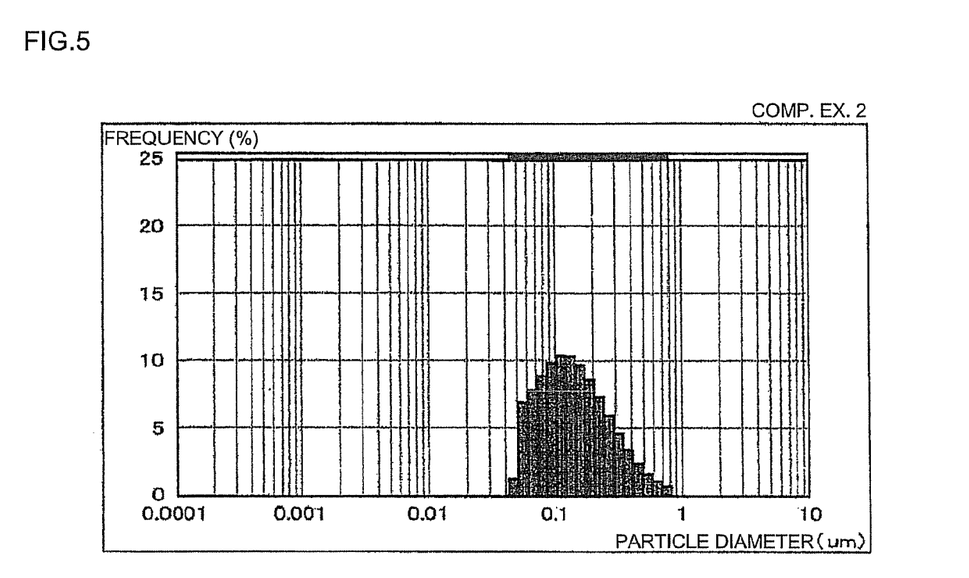
FIG. 5 is a chart showing a particle size distribution of the DDR-type zeolite powder of Comparative Example 2.

C1, θ1, C2, θ2, Ca, θa, Cb, and θb shown in the above formulae (I) to (III) are as follows:

FIG. 1 shows a result of X-ray diffraction analysis of a DDR-type zeolite powder by X-ray irradiation of the CuKα1 ray, where the horizontal axis shows the diffraction angle (2θ) and the vertical axis shows the diffraction intensity (cps). Hereinbelow, description is given with referring to FIG. 1. It should be noted that the specific numerical values relating to a diffraction angle in the following description is applied to the case where the X-ray of the CuKα1 ray is irradiated.

C1 is the minimum value of diffraction intensity between a diffraction peak derived from a (012) face of a DDR-type zeolite crystal and a diffraction peak derived from a (104) face of the same crystal. θ1 is a diffraction angle (2θ) showing C1.

C2 is the minimum value of diffraction intensity between a diffraction peak derived from a (606) face of a DDR-type zeolite crystal and a diffraction peak derived from a (1 2 20) face of the same DDR-type zeolite crystal. θ2 is a diffraction angle (2θ) showing C2.

Ca is diffraction intensity of a diffraction peak derived from a (024) face of a DDR-type zeolite crystal. θa is a diffraction angle (2θ) showing Ca.

Cb is the minimum value of diffraction intensity between a diffraction peak derived from a (122) face of a DDR-type zeolite crystal and a diffraction peak derived from a (027) face of the same DDR-type zeolite crystal. θb is a diffraction angle (2θ) showing Cb.

C1, θ1, C2, θ2, Ca, θa, Cb, and θb are determined on the basis of the knowledge relating to X-ray diffraction analysis of a DDR-type zeolite crystal described in Collection of Simulated XRD powder Patterns for Zeolites, Eds.: M. M. J. Treacy and J. B. Higgins, Elsevier (2001) and the following speculations by the present inventors.

C1 and C2 are values used for calculation of the background. The straight line connecting the coordinate (θ1, C1) with the coordinate (θ2, C2) in FIG. 1 shows the background.

The diffraction intensity is corrected by deducting the background value from the actual measured value.

Figure 9:
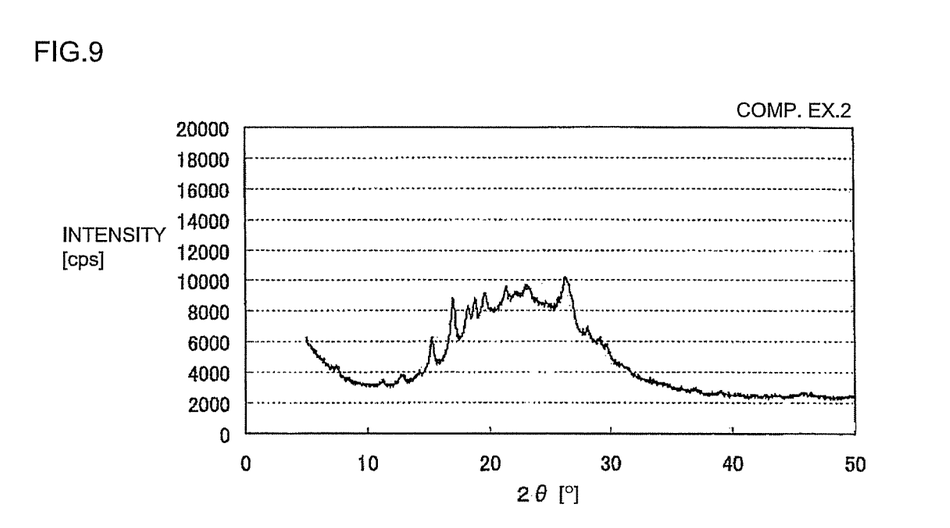
FIG. 9 is a chart showing an X-ray diffraction pattern of the DDR-type zeolite powder of Comparative Example 2.

In the X-ray diffraction analysis of a DDR-type zeolite powder, the diffraction peak derived from an amorphous contained in the DDR-type zeolite powder appears generally in the vicinity of a diffraction angle of 15 to 30° (see, e.g., FIG. 9, and the details will be described later).

Therefore, C1 and C2 are selected from the portion having a diffraction angle of below 15° or a diffraction angle of above 30° because the portion has little influence by diffraction intensity derived from a DDR-type zeolite crystal and diffraction intensity derived from an amorphous. Specifically, the diffraction angle θ1 is selected from the range below 15°, and the diffraction angle θ2 is selected from the range above 30°. Each of the θ1 and θ2 is defined on the basis of the speculation described below.

In the diffraction angle of below 15°, there is no other clear diffraction peak between the diffraction peak derived from the (012) face of the DDR-type zeolite crystal and the diffraction peak derived from the (104) face of the same DDR-type zeolite crystal, and the gap is the widest (see FIG. 1). Therefore, the gap between the diffraction peak derived from the (012) face of the DDR-type zeolite crystal and the diffraction peak derived from the (104) face of the same DDR-type zeolite crystal has little influence by the diffraction intensity derived from the DDR-type zeolite crystal and the diffraction intensity derived from the amorphous.

C1 is the minimum value of the diffraction intensity at the foot of both the aforementioned peaks where the influence of the diffraction intensity derived from the crystal and the amorphous is the smallest in this gap, that is, in the gap between the diffraction peak derived from the (012) face of the DDR-type zeolite crystal and the diffraction peak derived from the (104) face of the same DDR-type zeolite crystal. θ1 is defined as a diffraction angle showing C1.

In the diffraction angle of above 30°, since a large number of diffraction peaks derived from the DDR-type zeolite crystal are present, it is difficult to define C2 in the same manner as in C1.

In the diffraction angle of above 30°, there is picked up only a diffraction peak showing a diffraction intensity of 0.7% or more with respect to the diffraction intensity of the diffraction peak derived from the (024) face showing the highest diffraction intensity among the diffraction peaks derived from the DDR-type zeolite crystal.

In the distribution of the diffraction peak picked up in this manner, there is no other clear diffraction peak between the diffraction peak derived from the (606) face of the DDR-type zeolite crystal and the diffraction peak derived from the (1 2 20) face of the same DDR-type zeolite crystal, and the gap is the widest. Therefore, the gap between the diffraction peak derived from the (606) face of the DDR-type zeolite crystal and the diffraction peak derived from the (1 2 20) face of the same DDR-type zeolite crystal has little influence by the diffraction intensity derived from the DDR-type zeolite crystal and the diffraction intensity derived from the amorphous.

C2 is the minimum value of the diffraction intensity at the foot of both the aforementioned peaks where the influence of the diffraction intensity derived from the crystal and the amorphous is the smallest in this gap, that is, in the gap between the diffraction peak derived from the (606) face of the DDR-type zeolite crystal and the diffraction peak derived from the (1 2 20) face of the same DDR-type zeolite crystal. θ2 is defined as a diffraction angle showing C2.

Ca is diffraction intensity derived from the (024) face showing the highest diffraction intensity among the diffraction peaks derived from the DDR-type zeolite crystals. The diffraction peak can be identified easily in comparison with the other diffraction peaks derived from the other DDR-type zeolite crystals even if the content rate of the amorphous in the powder increases.

The right-hand member of the aforementioned formula (I) shows that the aforementioned Ca is reduced by the background value at diffraction angle θa. That is, the value of A is a value after the diffraction intensity of the diffraction peak attributed to the DDR-type zeolite crystal is corrected.

Subsequently, there is given a description of Cb, which is diffraction intensity attributed to the amorphous contained in the DDR-type zeolite powder.

The diffraction intensity derived from the amorphous contained in the DDR-type zeolite powder is generally the largest in the vicinity of a diffraction angle of 23° (see, e.g., FIG. 9, and the details will be described later). A large number of diffraction peaks derived from the DDR-type zeolite crystal appear in the vicinity of a diffraction angle of 23° (see FIG. 1). Therefore, it is difficult to assess the diffraction intensity derived from only the amorphous contained in the DDR-type zeolite powder.

The present inventors has studied a large number of diffraction patterns of the powder and are focusing on the gap between the diffraction peak derived from the (122) face of a DDR-type zeolite crystal and the diffraction peak derived from the (027) face of the same DDR-type zeolite crystal in the vicinity of a diffraction angle of 23°. This is because little influence of the diffraction intensity derived from the DDR-type zeolite crystal seems to be caused in the gap between both the diffraction peaks.

Cb is the minimum value of the diffraction intensity at the foot of both the aforementioned peaks where the influence of the diffraction intensity derived from the DDR-type zeolite crystal is assumed to be the smallest in this gap, that is, in the gap between the diffraction peak derived from the (122) face of the DDR-type zeolite crystal and the diffraction peak derived from the (027) face of the same DDR-type zeolite crystal. θb is defined as a diffraction angle showing Cb.

The right-hand member of the aforementioned formula (II) shows that the aforementioned Cb is reduced by the background value at diffraction angle θb. That is, the value of B is a value after the diffraction intensity attributed to the amorphous contained in the DDR-type zeolite powder is corrected.

The value of Y of the aforementioned formula (III) is a ratio of diffraction intensity A attributed to a DDR-type zeolite crystal in the DDR-type zeolite powder to diffraction intensity B attributed to an amorphous contained in the DDR-type zeolite powder. When the value of Y is large, it shows the state that the DDR-type zeolite crystal content rate is high and, relative to this, the state that the non crystal content rate is low.

In the DDR-type zeolite powder, in the case that the value of Y of the aforementioned formula (III) is 100 or more, the pore capacity characteristic of a DDR-type zeolite crystal structure is sufficiently secured. In this case, when it is used for an adsorbent aimed at low molecular gas, good adsorption performance is exhibited.

A DDR-type zeolite powder of the present invention described above can be obtained by the following production process (process for the production of a DDR-type zeolite powder of the present invention).

2. Process for the Production of DDR-Type Zeolite Powder:

2-1. Summary of Process for the Production of DDR-Type Zeolite Powder of the Present Invention:

A process for the production of a DDR-type zeolite powder of the present invention (hereinbelow referred to as a "production process of the present invention") has a step of subjecting a raw material solution where ethylenediamine containing 1-adamantanamine dissolved therein, silica ($SiO_2$), and water are mixed together to have a 1-adamantanamine/$SiO_2$ molar ratio of 0.002 to 0.5 and a water/$SiO_2$ molar ratio of 10 to 500 and where DDR-type zeolite seed crystals having a mean particle diameter of 10 to 300 nm are dispersed at 0.001 to 1.0 mass % to a heating treatment at 100 to 180° C. to allow the DDR-type zeolite seed crystals as nuclei to grow until they have a mean particle diameter of 0.1 μm or more and below 2.5 μm. Hereinbelow, the steps of a production process of the present invention will be described in detail in chronological order.

2-2. Preparation of DDR-Type Zeolite Seed Crystal:

The "DDR-type zeolite seed crystal" here is a particle of a DDR-type zeolite crystal functioning as a nucleus of crystal growth in the hydrothermal synthesis (described later in detail)

The DDR-type zeolite seed crystal can be obtained by preparing a DDR-type zeolite crystal by a conventionally known method such as the method described in the non patent document 3, and pulverizing the crystal. In addition, it is possible that, after the pulverization, classification is arbitrarily performed to select only the particles having desired mean particle diameters. Regarding the pulverization and the classification, methods a person of ordinary skill generally uses can be employed.

In a production process of the present invention, DDR-type zeolite seed crystals having a mean particle diameter of 10 to 300 nm are prepared.

2-3. Preparation of Raw Material Solution:

The raw material solution is prepared in such a manner that ethylenediamine containing 1-adamantanamine dissolved therein, silica ($SiO_2$), and water are mixed therein and that the aforementioned DDR-type zeolite seed crystal having a mean particle diameter of 10 to 300 nm are dispersed therein.

1-adamantanamine is an SDA (structure directing agent) used for synthesis of a DDR-type zeolite crystal, that is, a substance functioning as a mold for forming a crystal structure of DDR-type zeolite.

The molar ratio (1-adamantanamine/$SiO_2$ molar ratio) of 1-adamantanamine to silica ($SiO_2$) as a raw material for DDR-type zeolite is important. The 1-adamantanamine/$SiO_2$ molar ratio is necessarily within the range from 0.002 to 0.5, preferably 0.01 to 0.3, more preferably 0.01 to 0.1. When the 1-adamantanamine/$SiO_2$ molar ratio is smaller than this range, the 1-adamantanamine acting as the SDA is insufficient to make the DDR-type zeolite formation difficult. When the 1-adamantanamine/$SiO_2$ molar ratio is above this range, expensive 1-adamantanamine is added more than necessary, which is not preferable from the viewpoint of production costs.

1-adamantanamine dissolves slightly in water. Therefore, 1-adamantanamine is used for preparation of the raw material solution after being dissolved in ethylenediamine. The preparation of the raw material solution in the uniform state by completely dissolving 1-adamantanamine in ethylenediamine enables to grow DDR-type zeolite crystals having a uniform crystal size.

The molar ratio of ethylenediamine to 1-adamantanamine (ethylenediamine/1-adamantanamine molar ratio) is necessarily within the range from 4 to 35, preferably 8 to 24, more preferably 10 to 20. When the ethylenediamine/1-adamantanamine molar ratio is below this range, the amount of ethylenediamine is insufficient for completely dissolving 1-adamantanamine. On the other hand, when the ethylenediamine/1-adamantanamine molar ratio is above this range, ethylenediamine is used more than necessary, which is not preferable from the viewpoint of production costs.

In a production process of the present invention, silica sol can be used as a supply source of silica ($SiO_2$) mixed in the raw material solution. As the silica sol, a commercial silica sol can suitably be used. Besides, the silica sol can be prepared by dissolving a fine powdered silica in water or by subjecting alkoxide to hydrolysis.

In a production process of the present invention, the molar ratio (water/$SiO_2$ molar ratio) of the water as a solvent to silica ($SiO_2$) is necessarily within the range from 10 to 500, preferably 14 to 250, more preferably 14 to 112. When the water/$SiO_2$ molar ratio is below this range, it is not preferable because a large amount of unreacted $SiO_2$ which is not crystallized remains since the $SiO_2$ concentration of the raw material solution is too high. On the other hand, when the water/$SiO_2$ molar ratio is above this range, it is not preferable because the growth of the DDR-type zeolite crystal is difficult since the $SiO_2$ concentration of the raw material solution is too low.

According to a production process of the present invention, besides the all silica type DDR-type zeolite, there can be produced a DDR-type zeolite containing aluminum and a metal cation in the skeleton (hereinbelow referred to as "low silica type DDR-type zeolite"). Since the low silica type DDR-type zeolite has a cation in a pore, the adsorption performance and the catalyst performance are different from those of the all silica type DDR-type zeolite. In the case of producing low silica type DDR-type zeolite, an aluminum source and a cation source are added to the raw material besides water as a solvent and silica sol to prepare a raw material solution.

In a production process of the present invention, in the case that an aluminum source is added to the raw material solution, as the aluminum source, there can be used aluminum sulfate, sodium aluminate, metal aluminum, or the like.

The $SiO_2/Al_2O_3$ molar ratio in the case of conversion of aluminum as the oxide is necessarily within the range from 50 to 1000, preferably 70 to 300, more preferably 90 to 200. When the $SiO_2/Al_2O_3$ molar ratio is smaller than this range, it is not preferable in that the percentage of amorphous $SiO_2$ other than DDR-type zeolite increases. When the $SiO_2/Al_2O_3$ molar ratio is above this range, it is not preferable in that, though DDR-type zeolite can be produced, zeolite having a characteristic as a low silica type DDR-type zeolite cannot be obtained sufficiently due to remarkable decrease of the amount of aluminum and cation to make no difference from the production of all silica type zeolite.

In a production process of the present invention, in the case that a cation is added to the raw material solution, as the cation, a cation of one of alkali metals, that is, K, Na, Li, Rb, and Cs. As the cation source, there may be employed sodium hydroxide, sodium aluminate, or the like when it is explained by examples of Na.

The $X_2O/Al_2O_3$ molar ratio in the case of conversion of an alkali metal as the oxide is necessarily within the range from 1 to 25, preferably 3 to 20, more preferably 6 to 15. When the $X_2O/Al_2O_3$ molar ratio is below this range, it is not preferable in that DDR-type zeolite having the aimed $SiO_2/Al_2O_3$ molar ratio is hardly obtained. On the other hand, when the $X_2O/Al_2O_3$ molar ratio is above this range, it is not preferable because amorphous $SiO_2$ is mixed in the product.

A particularly preferable embodiment of a method for preparing a raw material solution is a method of preparing a raw material solution by mixing a solution containing 1-adamantanamine dissolved in ethylenediamine, water as a solvent, and silica sol (in the case of synthesizing low silica type DDR, further, aluminum sulfate as an aluminum source and sodium hydroxide as a cation source) together at predetermined ratio and dissolving them.

In particular, in a production process of the present invention, there is used a raw material solution where DDR-type zeolite seed crystals having a mean particle diameter of 10 to 300 nm are dispersed at 0.001 to 1.0 mass %.

As the method for dispersing DDR-type zeolite seed crystals in the raw material solution, there may be employed a general, stirring method which is generally employed by a person of ordinary skill in the technical field to which the present invention belongs. For example, by a method such as a supersonic treatment, DDR-type zeolite seed crystals can be dispersed in the raw material solution.

2-4. Heating Treatment (Hydrothermal Synthesis):

In a production process of the present invention, after the DDR-type zeolite seed crystals are added to and dispersed in the raw material solution as described above, a heating treatment is performed. This grows the crystals until the mean particle diameter become 0.1 μm or more and below 2.5 μm with the DDR-type zeolite seed crystals as the nuclei to produce DDR-type zeolite powder (The aforementioned heating treatment is also referred to as "hydrothermal synthesis")

In a production process of the present invention, the temperature for the heating treatment is necessarily within the range from 100 to 180° C., further preferably 130 to 180° C. When the temperature for the heating treatment is lower than this range, it is not preferable in that DDR-type zeolite cannot be formed. On the other hand, when the temperature for the heating treatment is above this range, it is not preferable in that DOH-type zeolite, which is not aimed at, is formed.

In a production process of the present invention, the heating treatment requires only a short period of time of generally 8 to 120 hours.

In a production process of the present invention, it is not necessary to stir the raw material solution constantly upon the heating treatment. This is because the raw material solution is maintained in a uniform state since 1-adamantanamine contained in the raw material solution is already dissolved in the ethylenediamine. According to a production process of the present invention, DOH is not formed even without constantly stirring the raw material solution, and DDR single phase crystals can be formed. In a conventional method, if the raw material solution is not stirred constantly, there is a case of forming mixed crystals of DDR and DOH.

In an embodiment of a production process of the present invention, the percentage ratio of the mass of the resultant DDR-type zeolite powder to the total of the mass of the silica contained in the raw material solution and the mass of the DDR-type zeolite seed crystal can be made 50% or more.

3. Function and Effect of the Present Invention:

By the aforementioned production process of the present invention, there can be obtained a DDR-type zeolite powder having a mean particle diameter of 0.1 μm or more and below 2.5 μm and a particle size distribution where particle sizes of 80% or more of the entire particles are within the range from −45% to +90% with respect to the mean particle diameter, that is, a DDR-type zeolite powder of the present invention.

A DDR-type zeolite powder of the present invention is constituted of fine particles and shows a particle size distribution where the majority of the particles have particle diameters converging in the vicinity of the mean particle diameter.

Hereinbelow, the function and the effect of a DDR-type zeolite powder of the present invention will be described with an example of the case where it is used as an adsorbent. In order that molecules are adsorbed effectively up to the inner portions (deep portions) of the pores of the particles in a short period of adsorption time, the powder is preferably constituted of particles having small particle diameters. This is because, when the particle diameters are large, molecules intended to be adsorbed cannot reach the deep portions of the pores in a short period of time. In addition, less variance in particle diameters of the particles constituting the powder provides a smaller difference in adsorption performance among different product lots. In consideration of these circumstances, a DDR-type zeolite powder of the present invention sufficiently and stably exhibits adsorption performance the powder can have in a short period of time. Further, in an embodiment where the value of Y in the aforementioned formula (III) is 100 or more, since the DDR-type zeolite crystal content rate is high with the crystal structure being secured, the number of pores effectively exhibiting the adsorption function and the like is large, and the adsorption efficiency is high.

A DDR-type zeolite powder of the present invention can be used as it is obtained in the aforementioned production process or used by mixing with another powder or the like. For example, when it is mixed with another powder or the like for use, particles capable of constituting the "DDR-type zeolite powder" defined above are extracted, and, when the powder composed of the extracted particles has characteristics (mean particle diameter and particle size distribution, and, in some cases, besides the aforementioned two characteristics, the value of Y of the aforementioned formula (III)) belonging to a DDR-type zeolite powder of the present invention, the use is considered to correspond to the use of a DDR-type zeolite powder of the present invention.

EXAMPLE

Hereinbelow, the present invention will be described in more detail on the basis of Examples. However, the present invention is by no means limited to these Examples.

4-1. Preparation of DDR-Type Zeolite Powder:

Example 1

For the preparation of DDR-type zeolite seed crystals, a DDR-type zeolite powder was produced on the basis of the description of the non patent document 3 or the Patent Document 1. Further, the DDR-type zeolite powder was pulverized by the use of a bead mill, Minicer, produced by Ashizawa Finetech Ltd. Specifically, a dispersion liquid where the DDR-type zeolite powder was dispersed in water was prepared, and pulverization was performed at a rotational frequency of 3820 rpm for two hours. The DDR-type zeolite dispersion liquid after the pulverization was subjected to centrifugal separation at 3000 rpm for 15 minutes by the use of a centrifugal separator, himacCT 5 L, produced by Hitachi, Ltd., to classify and remove coarse particles. The DDR-type zeolite dispersion liquid obtained in the aforementioned manner was used as a seed crystal dispersion liquid. The seed crystal dispersion liquid contained DDR-type zeolite seed crystals having a mean particle diameter of 172 nm.

(2) Preparation of Raw Material Solution:

After 4.21 g of ethylenediamine (produced by Wako Pure Chemical Industries, Ltd.) was put in a 100 ml jar made of fluorine resin, 0.66 g of 1-adamantanamine (produced by Aldrich) was added to the ethylenediamine and dissolved lest the precipitation of 1-adamantanamine should remain therein.

In a beaker prepared separately was put 47.60 g of the aforementioned seed crystal dispersion liquid containing DDR-type zeolite seed crystals at 0.5 mass %, and then 32.62 g of 30 mass % colloidal silica (Snowtex S produced by Nissan Chemical Industries, Ltd., with a dispersion medium of water) was added, followed by lightly stirring. Further, the mixed liquid was put in the aforementioned jar containing the mixture of ethylenediamine and 1-adamantanamine and mixed by shaking strongly to prepare a raw material solution. The raw material solution had a composition where the concentration of the DDR-type zeolite seed crystals was 0.28 mass %, 1-adamantanamine/$SiO_2$ molar ratio was 0.027, and a water/$SiO_2$ molar ratio was 24.

(3) Heating Treatment:

The raw material solution put in the aforementioned jar was further shaken for one hour by a shaker. Next, the raw material solution was poured into a stainless steel pressure resistant container with a fluorine resin inner cylinder having a capacity of 100 ml to perform a heating treatment (hydrothermal synthesis) at 135° C. for 48 hours. After the heating treatment, the reaction product was washed with water and dried to obtain a powder. Regarding thus obtained powder, the crystal phase was identified by X-ray diffraction, and the powder was confirmed to be a DDR-type zeolite powder.

(4) Combustion and Removal of 1-adamantanamine:

Further, using an electric furnace, the aforementioned DDR-type zeolite powder was heated at 650° C. for four hours in an ambient atmosphere. By this, the 1-adamantanamine present in pores of the DDR-type zeolite particles was combusted and removed.

Examples 2 and 3

The same operations as (1) to (4) of Examples 1 were performed except that a seed crystal dispersion liquid containing DDR-type zeolite seed crystals having a mean particle diameter of 129 nm was prepared in the preparation of the DDR-type zeolite seed crystals of (1) and that a heating treatment at 160° C. for 16 hours was performed in the heating treatment of (3).

Comparative Example 1

The same operations as (1) to (4) of Examples 1 were performed except that a seed crystal dispersion liquid containing DDR-type zeolite seed crystals having a mean particle diameter of 1.5 μm was prepared in the preparation of the DDR-type zeolite seed crystals of (1), that the DDR-type zeolite seed crystal concentration in the seed crystal dispersion liquid used for the raw material solution preparation of (2) was 0.0011 mass, that the DDR-type zeolite seed crystal concentration in the raw material solution after the preparation was 0.00062 mass %, and that a heating treatment at 160° C. for 48 hours was performed in the heating treatment of (3)

Comparative Example 2

A zeolite powder having a mean particle diameter of 132 nm was produced by pulverizing a DDR-type zeolite powder.

4-2. Particle Size Distribution of DDR-Type Zeolite Powder:

Regarding each of the suspensions of the powders of Examples 1 to 3 and Comparative Examples 1 and 2 after washing with water of the aforementioned step (3), the particle size distribution of the DDR-type zeolite powder was measured by the use of a particle size distribution measuring machine, Nanotrac (produced by Nikkiso Co., Ltd.). Nanotrac is an apparatus for obtaining a particle diameter on the basis of the laser Doppler method.

FIGS. 2 to 5 show particle size distributions of the DDR-type zeolite powders obtained in Examples 1 to 3 and Comparative Example 2. Each of FIGS. 2 to 5 shows a single logarithmic graph where the horizontal axis shows the particle diameter (μm) and where the vertical axis shows the frequency (%), and the horizontal axis has a logarithmic scale. Each of the DDR-type zeolite powders obtained in Examples 1 to 3 had little variance of the particle size in comparison with Comparative Example 2. Concrete results such as the mean particle diameter (d50) will be described below.

In a cumulative distribution in the DDR-type zeolite powder obtained in Example 1, the mean particle diameter (d50) was 568 nm, the particle diameter (d10) corresponding with the cumulative frequency of 10% was the mean particle diameter −103 nm, and the particle diameter (d90) corresponding with the cumulative frequency of 90% was the mean particle diameter +134 nm. Therefore, in the DDR-type zeolite powder obtained in Example 1, 80% of the entire particles were within the range from −18% to +24%.

In a cumulative distribution in the DDR-type zeolite powder obtained in Example 2, the mean particle diameter (d50) was 276 nm, the particle diameter (d10) corresponding with the cumulative frequency of 10% was the mean particle diameter −103 nm, and the particle diameter (d90) corresponding with the cumulative frequency of 90% was the mean particle diameter +141 nm. Therefore, in the DDR-type zeolite powder obtained in Example 2, 80% of the entire particles were within the range from −37% to +52%.

In a cumulative distribution in the DDR-type zeolite powder obtained in Example 3, the mean particle diameter (d50) was 539 nm, the particle diameter (d10) corresponding with the cumulative frequency of 10% was the mean particle diameter −237 nm, and the particle diameter (d90) corresponding with the cumulative frequency of 90% was the mean particle diameter +472 nm. Therefore, in the DDR-type zeolite powder obtained in Example 3, 80% of the entire particles were within the range from −44% to +88%.

In the suspension of Comparative Example 1 after the washing with water of the aforementioned step (3), most of the particles precipitated in the measurement cells within 2 minutes of the measurement time required for the measurement by Nanotrac. Therefore, in the zeolite powder obtained in Comparative Example 1, it could be considered that most particles had particle diameters of above 3 μm, which is considered to be the measurement limit of Nanotrac. Since the measurement by Nanotrac was impossible, regarding the DDR-type zeolite powder obtained in Comparative Example 1, data of the particle size distribution as shown in FIGS. 2 to 5 could not be obtained. Therefore, in Comparative Example 1, 10 particles were arbitrarily selected in an electron micrograph of a powder obtained after drying of the aforementioned step (3), and the particle diameters of these particles were measured. The mean particle diameter calculated by an arithmetic average from the particle diameters of the 10 particles was about 85 μm.

In a cumulative distribution in the DDR-type zeolite powder obtained in Comparative Example 2, the mean particle diameter (d50) was 132 nm, the particle diameter (d10) corresponding with the cumulative frequency of 10% was the mean particle diameter −69 nm, and the particle diameter (d90) corresponding with the cumulative frequency of 90% was the mean particle diameter +194 nm. Therefore, in the DDR-type zeolite powder obtained in Comparative Example 2, 80% of the entire particles were within the range from −52% to +147%.

4-3. Evaluation Test for Content Rate of DDR-Type Zeolite Crystal:

Regarding the powders obtained in Examples 1 to 3 and Comparative Example 2, there were calculated the diffraction intensity A of the diffraction peak attributed to a DDR-type zeolite crystal calculated from the aforementioned formula (I), the diffraction intensity B attributed to an amorphous contained in the DDR-type zeolite calculated from the aforementioned formula (II), and the value of Y showing the ratio A to B, which is calculated from the aforementioned formula (III). Incidentally, the powders passed through the combustion and removal of 1-adamantanamine of the aforementioned (4). Since the DDR-type zeolite powder obtained in Comparative Example 1 had very large particle diameters in comparison with the other powder and was significantly different from the characteristics of a DDR-type zeolite powder of the present invention, it was excluded from the present evaluation test.

4-3-1. X-Ray Diffraction Analysis and Calculation of Y Value:

X-ray diffraction analysis was performed by the use of a high resolution X-ray diffraction apparatus, RINT 2000 (produced by Rigaku Corporation). The X-ray irradiated was the CuKα1 ray and used at 50 kV and 300 mA. The scanning mode was successive, the scanning axis was 2θ/θ, and the scanning range was 5 to 50 degree. The scan step was 0.02 degree, and the scan speed was 1 degree per minute. From the diffraction pattern obtained above, C1, θ1, C2, θ2, Ca, θa, Cb, and θb were determined, and these values were applied to the aforementioned formulae (I) to (III) to calculate the Y value.

4-3-2. Results and Evaluation:

As the results of X-ray diffraction analysis relating to the DDR-type zeolite powders obtained in Examples 1 to 3 and Comparative Example 2, the diffractions patterns are shown in FIGS. 6 to 9. Further, regarding the DDR-type zeolite powders obtained in Examples 1 to 3 and Comparative Example 2, θ1, C1, θ2, C2, θa, Ca, θb, Cb, and the Y value are shown in Table 1.

TABLE 1

|  | θ1 [°] | C1 [cps] | θ2 [°] | C2 [cps] | θa [°] | Ca [cps] | θb [°] | Cb [cps] | Y |
|---|---|---|---|---|---|---|---|---|---|
| Example 1 | 9.98 | 1469 | 48.00 | 1079 | 17.12 | 74014 | 20.58 | 1459 | 735.5 |
| Example 2 | 10.34 | 1469 | 47.96 | 1083 | 17.10 | 69972 | 20.58 | 1607 | 282.1 |
| Example 3 | 9.74 | 1449 | 48.56 | 1107 | 17.10 | 68419 | 20.50 | 1668 | 213.6 |
| Comp. Ex. 2 | 10.16 | 3081 | 48.34 | 2268 | 17.08 | 8855 | 20.36 | 7928 | 1.2 |

Figure 6:
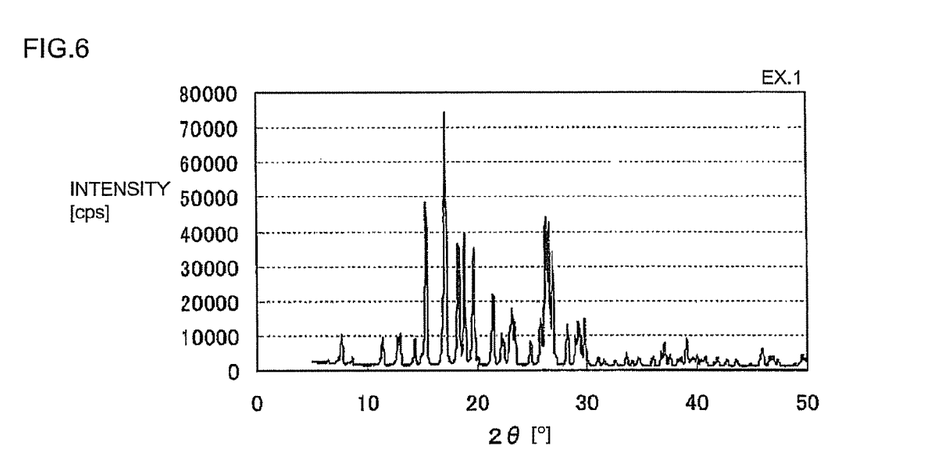
FIG. 6 is a chart showing an X-ray diffraction pattern of the DDR-type zeolite powder of Example 1.
Figure 7:
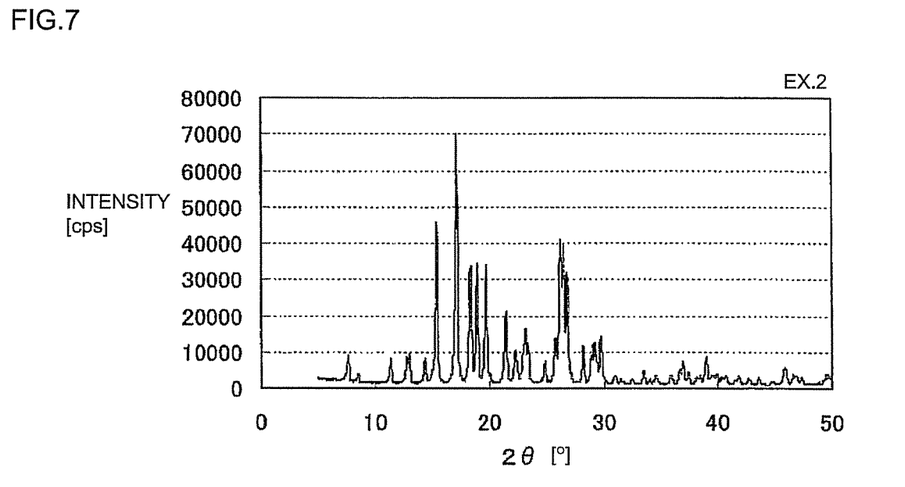
FIG. 7 is a chart showing an X-ray diffraction pattern of the DDR-type zeolite powder of Example 2.
Figure 8:
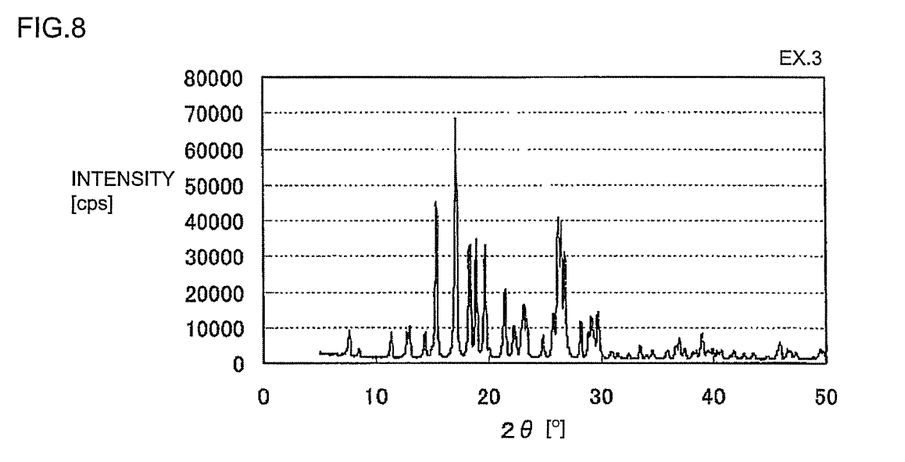
FIG. 8 is a chart showing an X-ray diffraction pattern of the DDR-type zeolite powder of Example 3.

As is understood from FIGS. 6 to 8, in the diffraction pattern of each of the DDR-type zeolite powders obtained in Examples 1 to 3, the diffraction peak derived from a DDR-type zeolite crystal was clearly exhibited. In contrast, as is understood from FIG. 9, in the diffraction pattern of the DDR-type zeolite powder obtained in Comparative Example 2, a halo pattern peculiar to a diffraction pattern of an amorphous was shown. The Y values were 735.5 in Example 1, 282.1 in Example 2, 213.6 in Example 3, and 1.2 in Comparative Example 2 as they support the diffraction patterns.

In Examples 1 to 3, since the DDR-type zeolite powders obtained were constituted of particles obtained by the crystal growth of the DDR-type zeolite seed crystals, they have high content rates of DDR-type zeolite crystals and low content rates of an amorphous. In Comparative Example 2, since the powder was obtained by pulverizing DDR-type zeolite particles having large particle diameters, external force was applied to the particles upon pulverization to produce many amorphous portions.

4-4. Measurement of Yield of DDR-Type Zeolite Powder:

The yield of the DDR-type zeolite powder was calculated as the mass ratio of the resultant DDR-type zeolite powder to the sum of the mass of silica ($SiO_2$) contained in the raw material solution and the mass of DDR-type zeolite seed crystals (percentage (%): mass of DDR-type zeolite powder/(mass of silica in raw material solution+mass of zeolite seed crystals)×100). The yields of the DDR-type zeolite powders were 62% in Example 1, 60% in Example 2, 55% in Example 3, and 90% in Comparative Example 1.

4-5. Comprehensive Evaluation:

From the above results, in Examples 1 to 3 as embodiments of a production process of the present invention, there were produced DDR-type zeolite powders each having a mean particle diameter of 0.1 μm or more and below 2.5 μm, where particle sizes of 80% or more of the entire particles are within the range from −45% to +90% with respect to the mean particle diameter. Further, each of the powders obtained in Examples 1 to 3 had the Y value calculated from the aforementioned formulae (I) to (III) of 100 or more. That is, it was found out that a DDR-type zeolite powder of the present invention described above can be produced according to a production process of the present invention.

What it comes down to is that the present Examples shows that a production process of the present invention is more excellent than conventional processes in the following three points. First, in a production process of the present invention, since it is possible to omit the step of pulverization and classification of the DDR-type zeolite powder having large particle diameters, the step being required in conventional processes, a production process of the present invention is superior in time cost and facility cost. Second, as is clear from the comparison between FIG. 2 and FIG. 5, a production process of the present invention is superior in that a powder having a mean particle diameter of 0.1 μm or more to below 2.5 μm can be produced with less variance in particle diameter. Third, a production process of the present invention is superior in that a powder having high content rate of DDR-type zeolite crystals and low content rate of non crystals can be produced. From above, the present Examples show that there can stably be produced a DDR-type zeolite powder exhibiting very excellent performance in application to a catalyst, a catalyst carrier, an adsorbent, and separation of low molecular gas by a production process of the present invention.

INDUSTRIAL APPLICABILITY

The present invention can be used as a DDR-type zeolite powder used for a catalyst, a catalyst carrier, an adsorbent, a gas separation membrane, a pervaporation membrane, and the like and as a process for the production of the DDR-type zeolite powder.

The invention claimed is:

1. A DDR-type zeolite powder having a mean particle diameter of 0.1 μm or more and below 2.5 μm and a particle size distribution where particle sizes of 80% or more of the entire particles are within the range from −45% to +90% with respect to the mean particle diameter;
    wherein a Y value calculated from the formula (III), which shows a ratio of the value of A, which is a value of the diffraction intensity of the diffraction peak attributed to the DDR-type zeolite crystal calculated from the formula (I) is corrected to the value of B, which is a value of the diffraction intensity attributed to the amorphous contained in the DDR-type zeolite powder calculated from the formula (II) is corrected on the basis of diffraction intensity obtained by X-ray diffraction analysis, is 100 or more:

$$A = Ca - \{(C2-C1)/(\theta 2-\theta 1) \times (\theta a - \theta 1) + C1\} \quad (I),$$

$$B = Cb - \{(C2-C1)/(\theta 2-\theta 1) \times (\theta b - \theta 1) + C1\} \quad (II),$$

$$Y = A/B \quad (III);$$

wherein, C1 is the minimum value of diffraction intensity between a diffraction peak derived from a (012) face of a DDR-type zeolite crystal and a diffraction peak derived from a (104) face of the same crystal, θ1 is a diffraction angle (2θ) showing C1, C2 is the minimum value of diffraction intensity between a diffraction peak derived from a (606) face of a DDR-type zeolite crystal and a diffraction peak derived from a (1 2 20) face of the same DDR-type zeolite crystal, θ2 is a diffraction angle (2θ) showing C2, Ca is diffraction intensity of a diffraction peak derived from a (024) face of a DDR-type zeolite crystal, θa is a diffraction angle (2θ) showing Ca, Cb is the minimum value of diffraction intensity between a diffraction peak derived from a (122) face of a DDR-type zeolite crystal and a diffraction peak derived from a (027) face of the same DDR-type zeolite crystal, and θb is a diffraction angle (2θ) showing Cb.

2. The DDR-type zeolite powder according to claim 1, wherein the mean particle diameter is 0.2 μam or more and below 1.0 μm.

3. A process for the production of the DDR-type zeolite powder of claim 1, the process comprising:
    a step of subjecting a raw material solution where ethylenediamine containing 1-adamantanamine dissolved therein, silica ($SiO_2$), and water are mixed therein to have a 1-adamantanamine/$SiO_2$ molar ratio of 0.002 to 0.5 and a water/$SiO_2$ molar ratio of 10 to 500 and where DDR-type zeolite seed crystals having a mean particle diameter of 10 to 300 nm are dispersed at 0.001 to 1.0 mass % to a heating treatment at 100 to 180° C. to allow the DDR-type zeolite seed crystals as nuclei to grow until they have a mean particle diameter of 0.1 μm or more and below 2.5 μm.

4. The process for the production of the DDR-type zeolite powder according to claim 3, wherein the percentage ratio of mass of the DDR-type zeolite powder to the total of mass of the silica contained in the raw material solution and mass of the DDR-type zeolite seed crystal is 50% or more.

5. The process for the production of the DDR-type zeolite powder according to claim 3, wherein an aluminum source is added to the raw material solution, and $SiO_2/Al_2O_3$ molar ratio in the raw material solution in the case of conversion of the aluminum as the oxide of the aluminum source is within the range from 50 to 1000.

6. The process for the production of the DDR-type zeolite powder according to claim 3, wherein alkali metals as a cation source are added to the raw material solution, and $X_2O/Al_2O_3$ molar ratio in the raw material solution in the case of conversion of an alkali metal (X) as the oxide is within the range from 1 to 25.

7. The DDR-type zeolite powder according to claim 1, wherein an intermediate product of the DDR-type zeolite powder comprises DDR-type zeolite particles containing 1-adamantanamine in pores of the DDR-type zeolite particles.

\* \* \* \* \*